United States Patent [19]
Krishnan et al.

[11] Patent Number: 4,788,721
[45] Date of Patent: Nov. 29, 1988

[54] ROUTING OF NETWORK TRAFFIC

[75] Inventors: Komandur R. Krishnan, Bridgewater Township, Somerset County; Teunis J. Ott, Chester Township, Morris County, both of N.J.

[73] Assignee: Bell Communications Research, Inc., Livingston, N.J.

[21] Appl. No.: 130,423

[22] Filed: Dec. 9, 1987

[51] Int. Cl.$^4$ .................. H04M 3/36; H04M 7/06
[52] U.S. Cl. ................................. 379/221; 340/827; 379/113
[58] Field of Search ............ 379/221, 220, 113, 230; 340/827

[56] References Cited

U.S. PATENT DOCUMENTS

| | | | |
|---|---|---|---|
| 4,345,116 | 8/1982 | Ash et al. | 379/221 |
| 4,669,113 | 5/1987 | Ash et al. | 379/221 |
| 4,704,724 | 11/1987 | Krishnan et al. | 379/221 |

OTHER PUBLICATIONS

"Use of a Trunk Status Map for Real-Time DNHR", by G. R. Ash, Eleventh International Teletraffic Congress, Sep. 1985, pp. 4.4A-4-1 to 4.4A-4-7.

"State Dependent Routing of Telephone Traffic and the Use of Separable Routing Schemes", by K. R. Krishnan and T. J. Ott, Eleventh International Teletraffic Congress, Sep. 1985, pp. 5.1A-5-1 to 5.1A-5-6.

"Dynamic Routing for Intercity Telephone Networks", by W. H. Cameron, J. Regnier, P. Galloy, A. M. Savoie, Tenth International Teletraffic Congress, Jun. 1983, Session No. 3.2, Paper No. 3 (8 pages).

"Routing of Telephone Traffic as a Controlled Markov Process", by K. R. Krishnan, T. J. Ott, Proceedings of 23rd Conference on Decision and Control, Dec. 13, 1984, pp. 1388, 1389.

"Multihour Dimensioning for a Dynamically Routed Network", by R. Huberman, S. Hurtubise, A. LeNir, T. Drwiega, Eleventh International Teletraffic Congress, Sep. 1985, pp. 4.3A-5-1 to 4.3A-5-7.

Primary Examiner—Thomas W. Brown
Attorney, Agent, or Firm—John T. Peoples

[57] ABSTRACT

A process is disclosed for routing service requests through a network comprising nodes interconnected with links. The network is also arranged so that each node may communicate with each of the other nodes. At preselected time intervals, sets of routes through the network are generated in response to the network configuration and traffic information. Also, at predetermined time intervals, occupancy factors are computed as determined by the network configuration and in response to traffic information. These occupancy factors are proportional to unassociated occupancy factors and allocation factors associated with calls of the various node-pairs; each of these latter factors is derived from a nominal routing scheme in which a call of the corresponding node-pair is treated as lost only if it is blocked on all of its permitted routes. Upon a request for service, the occupany factors corresponding to the busy-idle status of the links are used to compute an occupancy value associated with each of the end routes. Each route is converted to a candidate route based on traffic load at the initiation of the service request. The minimum occupancy value for each set of routes is selected as the candidate route for bridging a given node pair. If this minimum value is less than a preselected threshold, the traffic is routed over this candidate route, thereby satisfying the service request. Otherwise, the request is denied.

8 Claims, 3 Drawing Sheets

ROUTING OF NETWORK TRAFFIC

TECHNICAL FIELD OF THE INVENTION

This invention relates generally to routing of traffic through a complex network such as a telecommunications system and, more particularly, to an improved methodology for the state-dependent separable routing of traffic in a stored-program-controlled environment.

BACKGROUND OF THE INVENTION

A basic function required of a typical communication network is one of routing a service request through the network and then establishing a connection between an originating point and a destination point according to the route selected. In the terminology of telephony, this activity is often described as a calling party placing a call to a called party. The call is established on a path through the network designated a route. In turn, a route may be comprised of one or more intermediate points or nodes interconnected to other nodes by one or more links or trunk groups comprising servers or trunks. Examples of such networks are the intra-LATA (Local Access and Transport Area) telephone network and the interLATA (that is, long distance) telephone network.

It occasionally happens that the traffic, e.g., the call, is blocked either involuntarily or voluntarily. An involuntary blocking occurs when no route through the network can be found which has at least one free trunk in all the trunk groups. A voluntary blocking occurs when, even though an available route can be found, the call is blocked to protect future call attempts. A voluntary blocking may be indicated when the only available routes all go over two or more trunk groups, with a sizable risk that carrying one more call now will lead to multiple call blockings in the near future.

Traffic routing is evolving from time-invariant, hierarchical schemes to time-dependent, non-hierarchical schemes. In the first scheme, a routing plan with a hierarchical ranking of nodes is employed. In the telephone environment, these nodes may also be considered as switching centers since the nodes are implemented with switches. The highest ranking center has been designated a regional center (RC) followed in rank order by a sectional center (SC), a primary center (PC) and a toll center (TC). Each RC has one or more SCs homing on it; each PC homes on an RC or SC and has one or more TCs homing on it. Under this plan, any center homes on another center of higher rank within the same region but not on a center of lower rank. Time-invariant, hierarchical routing through such a network is effected by progressive routing (PR).

To describe briefly progressive routing and, shortly, other conventional schemes, a simplified hierarchical network is considered. In this illustrative network, a first PC (PC1) and a second PC (PC2) are directly connected; similarly, a first TC (TC1) connects to a second TC (TC2). Moreover, TC1 homes on PC1 and TC2 homes on PC2; TC1 is also connected to PC2 by a direct trunk group and, similarly, TC2 is connected to PC1 by a direct trunk group. The trunk groups (TG) interconnecting the various centers are designated by: TG1 links TC1 and TC2; TG2 links TC1 and PC2; TG3 links TC2 and PC2; TG4 links TC1 and PC1; TG5 links TC2 and PC1; and TG6 links PC1 and PC2. The call under consideration is to be routed from TC1 to TC2.

There are four possible routes between TC1 and TC2 defined as follows: the first route (R1) is composed of TG1; R2 includes TG2 and TG3; R3 comprises TG4 and TG5; and R4 comprises TG4, TG6 and TG3. In this progressive routing example, the first route considered, as required by the hierarchical ranking, is R1. If TG1 has a non-blocking status, the call is established over TG1. However, if TG1 is blocked, then R2 is considered next. If TG2 is free, routing control is passed from TC1 to PC2, without regard to the blocking status of TG3, the next link in R2. If TG3 is blocked, the calling party is given a network congestion signal indicative of a blocked route. With progressive routing, R3 or R4 is never tested if TG2 of R2 is free. In this example, it may have been possible to route the call over R3 if the status of each trunk group in R2 was known to TC1. With progressive routing, the routes between originating and destination points are not considered globally, but rather are treated on a local, step-by-step basis. Consideration on a local basis has, in part, been dictated by communication and signaling limitations imposed on the nodes.

With the present availability of stored program control (SPC) and so-called Common Channel Signaling (CCS) systems, communication among the various centers may now be effected without regard to hierarchy. One such routing method which advantageously utilizes the properties of SPC and CCS is disclosed in U.S. Pat. No. 4,345,116, issued Aug. 17, 1982. The subject matter of this reference, described as a dynamic, non-hierarchical routing (DNHR) scheme, is one example of time-dependent, non-hierarchical techniques.

As disclosed in the reference, the methodology controls the generation of a sequence of routes between a source node or switching point and a terminating node or switching point, each route choice being generated without regard to any network hierarchy. Each route, however, is generated in response to traffic demands during predetermined intervals and is subject to a grade of service constraint. That is, the selected sequence is one which is time sensitive and which is so chosen that its use during the specified time interval tends to mitigate the cost of the network that must be provided to meet grade of service. In the notation of the foregoing example, a sequence of routes between TC1 and PC2 for a first time period may be {TG1+TG3; TG2; TG4+TG6}, whereas in another time period the sequence may be {TG4+TG6; TG1+TG3}. If it is required to establish a call from TC1 to PC2 during the first time period, then the sequence associated with the source (TC1) and termination (PC2) nodes for this time period is accessed and processed sequentially by TC1. Thus, the route comprising TG1 and TG3 is selected initially and TC1 requests information, via the CCS network, from node TC2 regarding the blocking status of the pertinent trunk group TG3 terminating on intermediate node TC2. If it is supposed that TG1 is free but TG3 is blocked, then a so-called crankback signal is transmitted to the source node TC1 so the next route in the sequence, namely TG2, may be selected. If TG2 is not blocked, the call would be routed accordingly. This result should be contrasted to the progressive routing scheme; if progressive routing had been used with the sequence of routes under consideration, the call would have been blocked.

In a broad sense, it may be said that the foregoing technique for generating a sequence of routes between node pairs is dynamic in that routing decisions depend on the time of day or week. However, this technique is not truly state dependent. A state dependent routing scheme attempts to minimize call blocking by making, every time a call is attempted, a sophisticated routing decision based not only on the time of the call but also on the numbers of busy and idle trunks in the various trunk groups.

One example of such a state-dependent, dynamic, non-hierarchical routing (SDD) scheme is disclosed in a paper entitled "Dynamic Routing For Intercity Telephone Networks", published in the *Proceedings of the Tenth International Teletraffic Congress,* June, 1983 and authored by W. H. Cameron, J. Regnier, P. Galloy and A. M. Savoie. An extension to this basic SDD technique is described in another paper entitled "Multihour Dimensioning For A Dynamically Routed Network", published in the *Proceedings for the Eleventh International Teletraffic Congress,* September, 1985 as authored by R. Huberman, S. Hurtubise, A. LeNir and T. Drwiega.

Another example of a SDD scheme is described in a paper entitled "Use Of A Trunk Status Map For Real-Time DNHR", also published in the *Proceedings for the Eleventh International Teletraffic Conqress,* September 1985 as authored by G. R. Ash.

To contrast SDD techniques with non-state dependent DNHR networks, the previous example is considered in the SDD context. It is recalled that during the first time period, the sequence {TG1+TG3; TG2; TG4+TG6} was generated. Now, rather than selecting the routes in sequential order, the route which may be selected from the set is the one that contains the largest number of free trunks at the initiation of the call attempt. For instance, if both TG2 and TG3 have, at the same instant, the fewest number of free trunks, then the route selected comprises TG4 and TG6. Other variations on the basic technique are possible. In essence, however, SDD only accounts for the past and present state of the network at the initiation of a call attempt.

All of the previously discussed techniques represent tractable solutions to a very complex optimal control problem with a huge state space. Each solution is based on certain information about the network and certain approximations and, accordingly, departs from the optimal solution. As the solutions progress from PR to DNHR to SDD, more network information is being used. No routing solution, however, accounted for the future state of the network given the past and present states.

The first routing scheme in which the future effect of call-routing is explicitly considered is the state-dependent "separable" routing technique. This technique is the subject matter of our U.S. Pat. No. 4,704,724 issued on Nov. 3, 1987. As disclosed in this patent, a "cost" of adding the (j+1)st call to a trunk group when j calls are already in progress is determined for each trunk group. This cost is a measure of the probable effect of admitting the present call on the blocking of future calls offered to the trunk group. The cost of a multi-link route is the sum of the costs of the trunk groups on the route. When a call arrives, the cost of each potential route is calculated for the current network state, and the call is either carried on the least-cost route, or it is rejected if the cost exceeds the cost of blocking the present call.

The version of the separable routing technique disclosed in our patent makes several approximations in its mathematical model to foster a tractable solution. In particular, the technique utilizes a procedure known as "policy iteration" in the theory of Markov Decision Processes. This name is associated with the following procedure: (i) begin with a "nominal" routing scheme (policy) for which it is feasible to determine the cost associated with different route selections in the network; and (ii) let these nominal costs serve as a guide to the actual selection of routes for each arriving call, thereby producing a new routing scheme or a new policy, which is the result of a "policy iteration" applied to the nominal scheme. The version of separable routing disclosed in our patent was derived from a nominal scheme in which a call blocked on a single route was treated as a lost call. Such a starting point provided excellent call routing capabilities; however, there is room for improvement since optimal performance has not yet been achieved.

SUMMARY OF THE INVENTION

The limitations and shortcomings of these and other techniques are obviated, in accordance with the present invention, by an improved method that controls the selection of traffic routes through the network as determined by the network configuration and in response to past and present traffic as well as estimates of future traffic blocking if the presently offered traffic is routed. The improved method utilizes "policy iteration" wherein the starting point of the nominal scheme is one in which a call is lost only when all its routes are busy.

Broadly speaking, the overall network is configured as a plurality of intelligent nodes which are interconnected by links comprising servers. Each node may communicate with the other nodes, illustratively, via a network processor coupled to all the nodes. Besides the direct link, routes comprising two or more links between node pairs are permitted. For use at preselected time intervals, sets of routes between node pairs are generated as determined by the network configuration and the past and present traffic and traffic forecasts. Moreover, at predetermined time intervals, the improved method provides occupancy factors that are computed for each link and for each node-pair whose calls can traverse that link, as determined by the network configuration and in response to traffic information. Upon a service request requiring the establishing of a route through the network, the occupancy factors corresponding to the busy-idle status of the servers at the initiation of the request are used to compute occupancy values associated with each of the routes designated as admissible for that service request at that time. The minimum value route in the set of routes associated with the service request is selected as a candidate route. If the minimum value does not exceed a preselected threshold, the service is routed over the network links comprising this candidate route. Otherwise, the service request is denied.

If all routes comprise, at most, two links, then processing by the network processor may be off-loaded to the nodes. In this situation, the occupancy factors and sets of routes associated with an individual node are stored in the node. Upon a service request, the originating node sends a message to the destination node requesting the occupancy factors applicable to the present busy-idle status on servers pertinent to the routing of the present call. These messages are serviced by the network processor. Upon receipt of the response message, the originating node has acquired all the information necessary to compute the occupancy values and route the call if the threshold comparison is satisfied.

The organization and operation of this invention will be better understood from a consideration of the detailed description of the illustrative methodologies, which follow, when taken in conjunction with the accompanying drawing.

DETAILED DESCRIPTION

Figure 1:
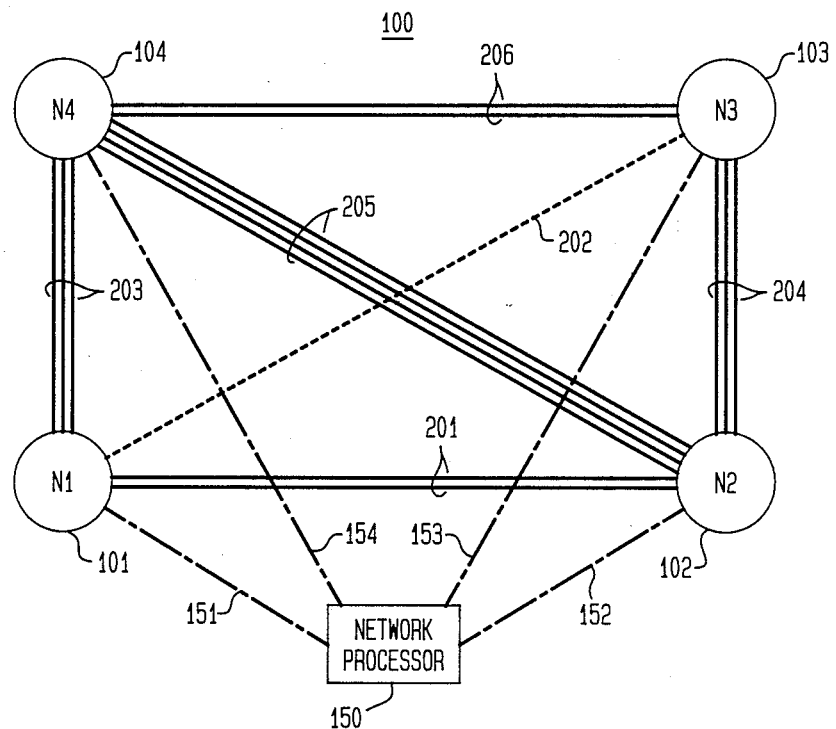
FIG. 1 is a block diagram depicting a network comprising nodes, links interconnecting the nodes and a network processor coupled to the nodes, this network being illustrative of the types of network arrangements controlled by the improved methodology of the present invention.

In describing an illustrative embodiment, it is helpful in conveying the principles of the present invention to consider the specific network depicted in FIG. 1. Although this network is less complex than those encountered in practice, the small size of the network allows for brevity of description without loss of generality.

With reference to FIG. 1, network 100 comprises four nodes 101-104 (N1-N4) interconnected by six links 201206. In the network under consideration, each node is thought of as being interconnected to the other nodes via links. However, some links may not actually be implemented, as exemplified by link 202 (shown dashed). In general, a network of N nodes is interconnected by $(N)(N-1)/2$ links. Besides the node-link configuration, network processor 150 is coupled to nodes 101-104 via channels 151-154, respectively. Oftentimes, channels 151-154 are realized with dedicated, high-speed data lines.

In the telecommunications art, each node 101,102,103 or 104 may be realized as a control switching point comprising an electronic stored program controlled office such as the No. 4 ESS disclosed in the publication of *The Bell System Technical Journal*, Vol. 56, No. 7, September 1977, pp. 1015-1336. A portion of network processor 150 and channels 151-154 may be provided by a Common Channel Interoffice Signaling system as disclosed in the publication of *The Bell System Technical Journal*, Vol. 57, No. 2, February 1978, pp. 221-447. Thus, these references may be consulted for a detailed understanding of control switching points as well as the signaling among these points. Such arrangements are in public use and, as will be described in what follows, such arrangements may be modified for embodying the principles of the present invention.

Moreover, in the art of telephony, certain general terms like node, link and server (a link comprises a plurality of servers) are referred to by different terms. Thus, a node is a switching point, a link is a trunk group and a server is a trunk. These terms may be used interchangeably when telephony-related subject matter is discussed.

To describe succinctly the routing process of the present invention, a notation is introduced. The process is then described with reference to this notation and the parameters exhibited by FIG. 1. The network under consideration has N nodes and $K=(N)(N-1)/2$ links.

Each link k, k=1 to K, comprises $s_k$ servers where $s_k \geq 0$. Occupancy factors $\Delta_m(k,j)$, for link k in state j, associated with a node-pair m whose calls have a route traversing link k, where $$1 \leq k \leq K, \ 0 \leq j \leq s_k, \ 1 \leq m \leq K$$

$$0 \leq \Delta_m(k,j) \leq 1 \text{ and } \Delta_m(k,s_k) = 1,$$

are computed based on $N, K, s_k$ (k=1 to K), the time of day, the day of the week, traffic measurements and, importantly, traffic forecasts. For $0 \leq j < s_k$, the occupancy factor $\Delta_m(k,j)$ associated with node-pair m is computed from the formula $$\Delta_m(k,j) = \theta_{km} \Delta(k,j),$$

where $\Delta(k,j)$ is the 'original' or 'unassociated' occupancy factor for link k in state j as disclosed in our earlier patent, and $\theta_{km}$ is an allocation factor associated with the use of link k by calls of node-pair m. The determination of $\theta_{km}$ is discussed later. These factors have the following interpretation: each $\Delta_m(k,j)$ approximates the "cost", in terms of future call blockings, of increasing the number of busy servers in link k from j to j+1 by carrying a call coupling node-pair m. Procedures for computing the factors are discussed later.

With respect to FIG. 1, N=4 and K=6. Link 1 interconnects nodes 101 and 102 and is identified with reference numeral 201; link 1 is also referred to as trunk group 1 (TG1). As depicted, $s_1=2$. Link 2, shown as interconnecting nodes 101 and 103, is not actually available to route a call since $s_2=0$. The remaining links may be described similarly.

The procedure also requires that a set of routes between each pair of nodes be available. Typically, these routes are generated at predetermined intervals and stored until updated. Generation is usually effected off-line with processor 150. For sake of example, routes of length one or two links in network 100 are considered. Then, for instance, nodes 101 and 102 have two possible interconnect routes, namely: link 201 (TG1); and the cascade of links 203 and 205 (TG3 and TG5). The set of routes between nodes 101 and 102, designated $S_1$, has elements where $R_{11} = TG1$ and $R_{12} = TG3 + TG5$, with the plus operator designating series interconnection. In general, $S_k = \{R_{kn}, n=1 \text{ to } M\}$, M being the number of one or twolink routes between the node pair associated with $S_k$. A summary of the one or two-link routes for network 100 is given by TABLE I ($R(k,n)$ is equivalent to $R_{kn}$).

TABLE I

| Route | TG1 | TG2 | TG3 | TG4 | TG5 | TG6 |
|---|---|---|---|---|---|---|
| R(1,1) | X | | | | | |
| R(1,2) | | | X | | X | |
| R(2,1) | X | | | X | | |
| R(2,2) | | | X | | | X |
| R(3,1) | | | X | | | |
| R(3,2) | X | | | | X | |
| R(4,1) | | | | X | | |
| R(4,2) | | | | | X | X |
| R(5,1) | | | | | X | |
| R(5,2) | X | | X | | | |
| R(5,3) | | | | X | | X |
| R(6,1) | | | | | | X |
| R(6,2) | | | | X | X | |

TABLE I provides the coupling information for each node-pair m necessary to define the requisite occupancy parameters. For instance, from the first two rows of TABLE I, if node-pair $N_1,N_2$ is defined as node-pair 1 (m=1), then the possible links coupling this node-pair are links 1, 3 and 5. Similarly, if node-pair $N_1,N_3$ is node-pair 2 (m=2), then the possible links coupling this node-pair are links 1, 3, 4 and 6. The remaining four node-pairs are defined in a similar manner.

A summary of complete link and server information for network 100, as well as both the original and modified occupancy factors of the improved method, are shown in TABLE II.

TABLE II

| Link k | Size $s_k$ | Load $\lambda_k$ | State j | Factors $\Delta(k,j)$ | $\Delta_1(k,j)$ | $\Delta_2(k,j)$ | $\Delta_3(k,j)$ | $\Delta_4(k,j)$ | $\Delta_5(k,j)$ | $\Delta_6(k,j)$ |
|---|---|---|---|---|---|---|---|---|---|---|
| 1 | 2 | 1.35 | 0 | 0.278 | 0.155 | 0.224 | 0.278 | — | 0.278 | — |
|   |   |   | 1 | 0.485 | 0.270 | 0.391 | 0.485 | — | 0.485 | — |
|   |   |   | 2 | 1.0 | 1.0 | 1.0 | 1.0 | — | 1.0 | — |
| 2 | 0 |   |   |   |   |   |   |   |   |   |
| 3 | 3 | 2.21 | 0 | 0.241 | 0.241 | 0.241 | 0.090 | — | 0.241 | — |
|   |   |   | 1 | 0.351 | 0.351 | 0.350 | 0.131 | — | 0.351 | — |
|   |   |   | 2 | 0.559 | 0.559 | 0.557 | 0.208 | — | 0.559 | — |
|   |   |   | 3 | 1.0 | 1.0 | 1.0 | 1.0 | — | 1.0 | — |
| 4 | 3 | 2.22 | 0 | 0.244 | — | 0.216 | — | 0.110 | 0.244 | 0.244 |
|   |   |   | 1 | 0.353 | — | 0.313 | — | 0.160 | 0.353 | 0.353 |
|   |   |   | 2 | 0.561 | — | 0.498 | — | 0.254 | 0.561 | 0.561 |
|   |   |   | 3 | 1.0 | — | 1.0 | — | 1.0 | 1.0 | 1.0 |
| 5 | 4 | 2.30 | 0 | 0.128 | 0.128 | — | 0.128 | 0.128 | 0.024 | 0.128 |
|   |   |   | 1 | 0.183 | 0.183 | — | 0.183 | 0.183 | 0.034 | 0.183 |
|   |   |   | 2 | 0.287 | 0.287 | — | 0.287 | 0.287 | 0.054 | 0.287 |
|   |   |   | 3 | 0.502 | 0.502 | — | 0.502 | 0.502 | 0.094 | 0.502 |
|   |   |   | 4 | 1.0 | 1.0 | — | 1.0 | 1.0 | 1.0 | 1.0 |
| 6 | 2 | 1.11 | 0 | 0.226 | — | 0.225 | — | 0.226 | 0.226 | 0.078 |
|   |   |   | 1 | 0.429 | — | 0.427 | — | 0.429 | 0.429 | 0.148 |
|   |   |   | 2 | 1.0 | — | 1.0 | — | 1.0 | 1.0 | 1.0 |

Columns one and two provide the link and server information, respectively. In addition, the fourth column shows the various states j, j=0 to $s_k$, for each link and the fifth column lists the corresponding 'unassociated' factors $\Delta(k,j)$ for each link and state; columns 6-11 show the occupancy factors associated with node-pairs whose calls can use the link. If node-pair m cannot use link k, the corresponding entries are left blank. (The numbers in the column designated "Load" will be covered during the discussion on the computation of the factors; it will aid the understanding to have $\lambda_k$ placed in context with associated $\Delta(k,j)$ factors).

When a call is offered to the network which requires routing from, say, node I to node J (node-pair m) (I=N1,N2,N3 or N4, J=N1,N2,N3 or N4, I≠J), the set associated with the node pair is accessed. For each route, designated R, in the accessed set, occupancy values V(R) are computed as follows:

$$V(R) = \sum_{k \in R} \Delta_m(k,X_k) = \sum_{k \in R} \theta_{km}\Delta(k,X_k)$$

where the sum is over the k links in route R, and $X_k$ is the number of busy trunks in link k at the time of the call attempt.

As a final step, the route between nodes I and J exhibiting the minimum value is selected for further scrutiny. If the minimum value is less than a threshold, the call is routed over the route associated with the minimum value; otherwise, the call is blocked.

To elucidate the computations of occupancy values, the network of FIG. 1 is utilized and, again for illustrative purposes, there is the restriction that routes of, at most, two links are permitted. At the instant a call is to be routed through the network, the state of the network and the occupancy-factors for calls of node-pair 1 are as summarized in TABLE III.

TABLE III

| Link k | Busy $X_k$ | Factor for Node-Pair 1 $\Delta_1(k, X_k)$ |
|---|---|---|
| 1 | 1 | 0.270 |
| 2 |   |   |
| 3 | 2 | 0.559 |
| 4 | 2 |   |
| 5 | 3 | 0.502 |
| 6 | 0 |   |

As exhibited by the middle column ("Busy") of TABLE III, all links for node-pair 1 have all but one server busy. The appropriate factors from TABLE II for this instantaneous network state are repeated, for each link, in the third column of TABLE III. With the data shown in TABLE III and the route sets summarized in TABLE I, the occupancy values V(R) for each route in the first set may now be computed.

$$V(R_{11}) = \Delta_1(1,X_1) = \Delta_1(1,1) = 0.270, \text{ and} \quad (1)$$

$$V(R_{12}) = \Delta_1(3,X_3) + \Delta_1(5,X_5) = \Delta_1(3,2) + \Delta_1(5,3) = 1-.061 \quad (2)$$

By way of another example, the second route in the fifth set becomes, from TABLE II, $$V(R_{52}) = \Delta_5(1,X_1) + \Delta_5(3,X_3) = \Delta_5(1,1) + \Delta_5(3,2) = 1-.044.$$

A summary of values V(R) for each route in each set is presented in TABLE IV.

TABLE IV

| Route | Value |
|---|---|
| R(1,1) | 0.270 |
| R(1,2) | 1.061 |
| R(2,1) | 0.889 |
| R(2,2) | 0.782 |
| R(3,1) | 0.208 |
| R(3,2) | 0.987 |
| R(4,1) | 0.254 |
| R(4,2) | 0.728 |
| R(5,1) | 0.094 |
| R(5,2) | 1.044 |

TABLE IV-continued

| Route | Value |
| --- | --- |
| R(5,3) | 0.787 |
| R(6,1) | 0.078 |
| R(6,2) | 1.063 |

If it is supposed that an incoming call is to be routed from N1 to N2, then the set of routes associated with this call is $S_1=\{R_{11},R_{12}\}$. There is now a corresponding occupancy value set $\{0.270,1.061\}$. The route with the minimum occupancy value at this instant is $R_{11}$, and this is to be compared to a preselected threshold. This threshold is generally 1.0 for unnormalized $\Delta_m(k,j)$ factors. Since the minimum occupancy value, namely, 0.270, is less than the threshold, the call is routed over the route corresponding to this minimum occupancy value. Here, the call from N1 to N2 is routed over link 1 or TG1 since $R_{11}$=TG1. (To illustrate blocking, if $X_1=2$, then the set would be $\{1.000,1.061\}$, and the call would be blocked).

By way of terminology, the route in a given set having the minimum occupancy value is called the candidate route in that set. Embedded in the notion of candidate route is the continually changing nature of the routes in response to busy-idle conditions. A set of routes is somewhat static, whereas a candidate route is dynamic. Of course, the set of routes may be updated, but this generally occurs off-line at a relatively slow rate compared to network dynamics.

Figure 2:
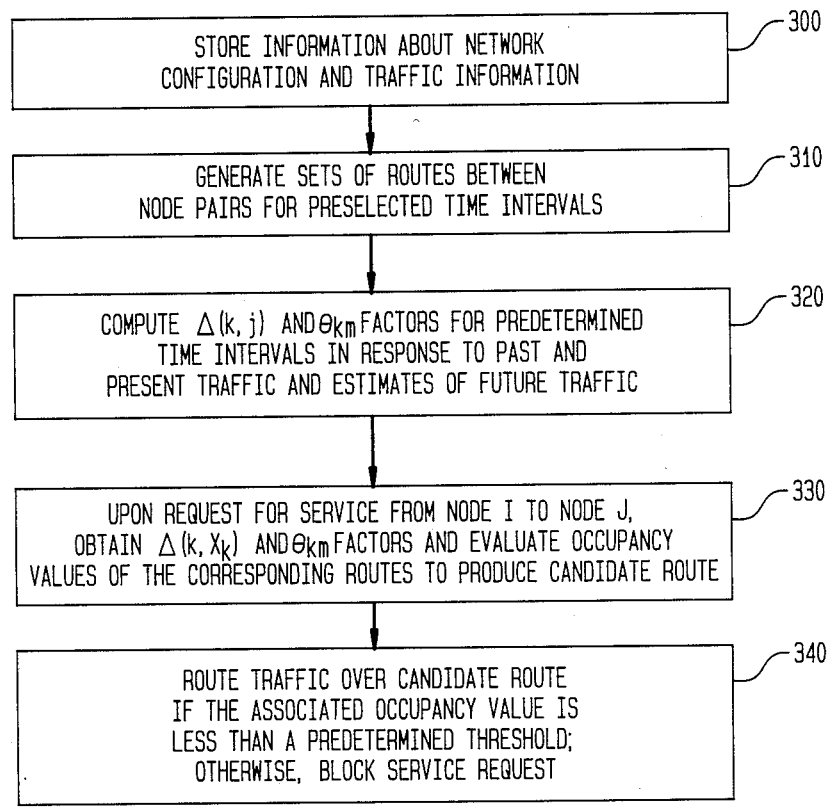
FIG. 2 is a flow diagram illustrative of the steps for controlling the routing of a service request through a general network.

FIG. 2 is a flow diagram illustrative of the steps described above for controlling the routing of a request for service through a given network. Block 300 indicates that certain information about the network configuration, such as the number of nodes, the links, the servers, and traffic information, such as the time of day, day of the week and past and present traffic, is available for processing. From the configuration and traffic information, the sets of routes are generated, as indicated by block 310. These sets are valid for preselected time intervals, which may be measured in weeks or months. Block 320 indicates that, for predetermined time intervals, the $\Delta_m(k,j)$ factors are computed with reference to established and estimated traffic. Upon a service request, the processing of block 330 is invoked. The state of the network at the initiation of the service request is employed to provide the $\Delta_m(k,X_k)$ factors and, in turn, the candidate route from the evaluation of the occupancy values for the corresponding routes. Finally, as depicted by block 340, traffic is routed on the candidate route between pairs of nodes, provided the minimum occupancy value is less than a preselected threshold. If the threshold is exceeded, the service request is blocked.

To this point in the description, the discussion has focussed on the methodology in an overview fashion, even though a specific network has been employed to exemplify basic principles. The focus of the description now shifts to allocation of the process steps among the various network components. Two cases are distinguished. Both cases, however, require that all nodes are comprised of stored program control type devices and that the network processor updates the coefficients $\Delta_m(k,j)$, relatively infrequently, say every half hour to two hours.

Case 1

In the first case, only routes of length one or two links are permitted and all nodes are able to send each other messages via the network processor. The network of FIG. 1 may again be employed to depict this situation. Each node 101-104 maintains a table of the 'unassociated' factors $\Delta(k,j)$, (but only for those links terminating on the given node), and the allocation factors $\theta_{km}$ for those node-pairs m whose calls can traverse link k. These factors are updated infrequently by network processor 150 and downloaded to nodes 101-104 via channels 151-154, respectively. Each node 101,102,103 or 104 has stored, for every link k terminating on that node, the current value of $X_k$ and therefore can provide the 'unassociated' factors $\Delta(k,X_k)$ and the allocation parameters $\theta_{km}$ for its portion of the routes.

When a call arrives at the originating node, say node I, node I effects a called number translation so that the destination node, say node J, may be identified. Node I sends a message to node J via processor 150 and the corresponding channels. The message identifies node I and reports the call attempt. The standard response from node J is a message which contains, for all routes between nodes I and J, the $\Delta(k,X_k)$ factors of the links terminating on node J and the allocation factors of those links associated with I-J calls. ($\Delta(k,X_k)$ for one-link routes need not be sent since node I already has that information).

Since only one or two links are allowed in any route, node I now has all the information to complete the necessary additions, find the minimum occupancy value to determine the candidate route and then make a routing decision. If the call is accepted, it may be set up by any of the known signaling techniques utilizing processor 150 and channels 151-154.

In the earlier description, a call was to be routed from node 101 to node 102 given the network state summarized by TABLE III. To illustrate the methodology of this case, it is required that node 101 evaluate the occupancy values as depicted by equations 1 and 2. Node 101 has available information about links 201 and 203 since these links emanate from node 101; to complete the computations, node 101 requires the information with respect to link 205 which terminates on node 102. Upon receipt of a request message, node 102 responds with a message containing the factor $\Delta(5,X_5)$ and $\theta_{51}$. The candidate route may now be computed and decision rendered accordingly.

The efficacy of this method lies in the fact that only one message transaction per call attempt is generated, and this transaction impacts only processor 150 and the originating and destination nodes. As such, the load on processor 150 is mitigated.

Figure 3:
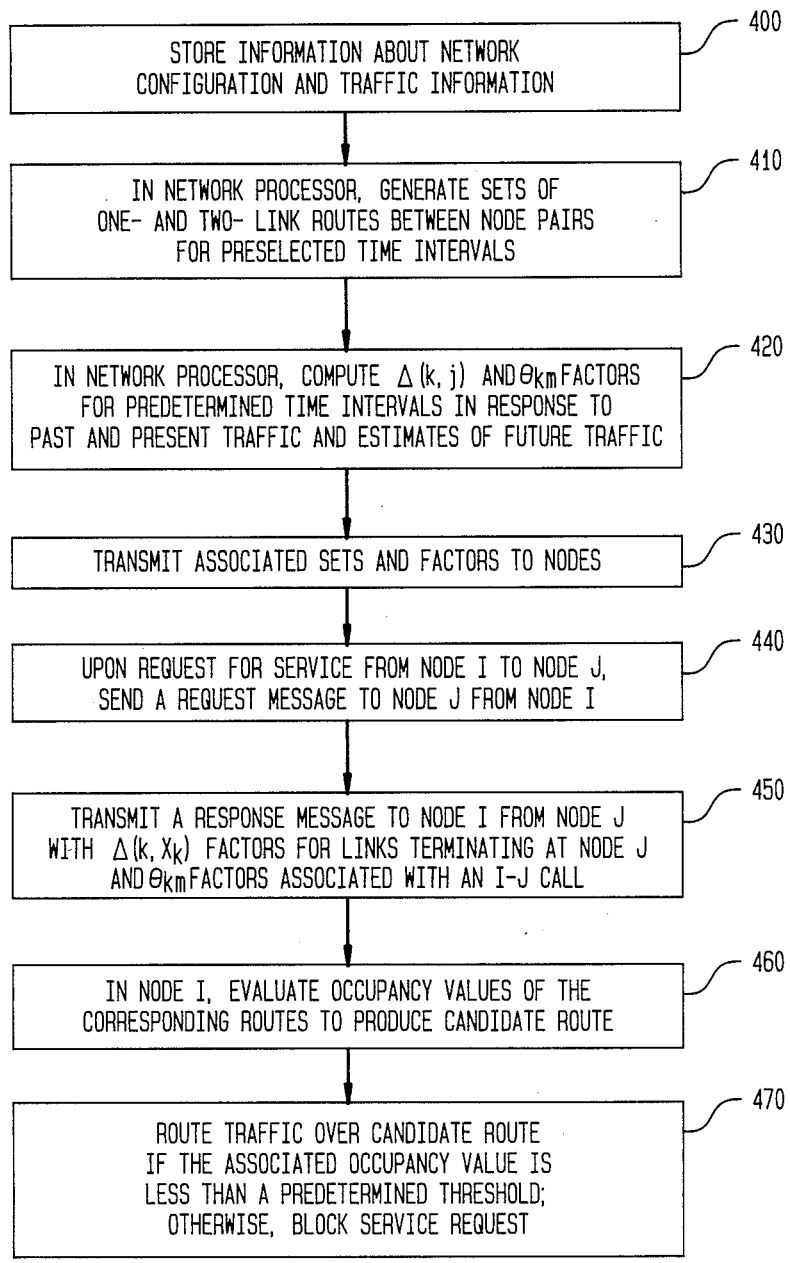
FIG. 3 is a flow diagram illustrative of the steps for controlling the routing of a service request through a general network presuming that only one and two link routes are permitted.

FIG. 3 is a flow diagram illustrative of the steps described with respect to Case 1 for controlling the routing of a service request through a given network. Block 400, which is essentially the same as block 300 of FIG. 2, indicates that certain information such as number of nodes, links and servers as well as time of day and week and past and present traffic is available to access and process, generally in network processor 150. Blocks 410 and 420 depict that the generation of sets of routes and the $\Delta(k,j)$ and $\theta_{km}$ factors at predefined intervals, respectively, are effected in processor 150. As indicated by block 430, the sets and factors associated with particular nodes are downloaded to the respective nodes, generally on an infrequent basis. Blocks 440 and 450 represent the message interchange steps between nodes I and J upon a request for service. The primary purpose of the message interchange is to reveal to node I the $\Delta(k,X_k)$ and the $\theta_{km}$ factors that it does not have within its stored tables. Based on the revealed factors $\Delta(k,X_k)$ and $\theta_{km}$, the occupancy values of the routes may be evaluated to produce the candidate route, as block 460 depicts. Finally, block 470, which performs basically the same function as block 340 of FIG. 2, compares the candidate value to the threshold and handles the service request according to the result of the comparison.

Many variations on the basic technique of Case 1 may be anticipated by those skilled in the art. For instance, the request message sent from node I to node J may also contain the information about the service request, e.g., the called party digits. In this manner, node J may check the outgoing telecommunication path to determine whether it is available. If it is not available, the response message may indicate this additional information and a busy tone may be returned to the calling party by node I.

Also, it may be advantageous for node I to reveal the $\Delta(k,X_k)$ and $\theta_{km}$ factors in the message it transmits to node J. In this approach, node J does the necessary evaluations and makes the routing decision. With this approach, the call set-up may be initiated by node J at the same time the response message is returned to node I, thereby decreasing call set-up delay.

Case 2

In this second case, routes of arbitrary length are allowed. The $\Delta(k,j)$ and $\theta_{km}$ factors are updated infrequently (say every half hour to two hours), but the factors remain in network processor 150, that is, no downloading occurs. Frequently, say every ten seconds, nodes 101–104 report to processor 150 the status of all links terminating at the individual nodes. (In actuality, only links where the server activity changes need to be reported). Network processor 150 then computes, for every pair of nodes, the occupancy values of the sets of routes to arrive at the candidate routes. These routes with minimum occupancy values are stored and any node pair requiring an interconnection path may access the occupancy value information. Again, a route is selected only if the minimum occupancy value associated with a route is less than a threshold. The flow diagram of FIG. 2 represents the steps of this case. Basically, for this case, the computations are completed in network processor 150 in contrast to allocating some computations to the nodes, as in the former case.

Variations on this basic technique may also be appreciated by those skilled in the art. For instance, after the occupancy values are computed, those routes with values exceeding the threshold may be eliminated. Then, for each pair of nodes, processor 150 assigns a probability to each of the remaining routes, where lower-occupancy value routes are given higher probabilities. The probabilities are downloaded to the respective nodes.

In the interval between computations of occupancy values, if a call request is made from node I to node J, node I will randomly select a route from the available list based on the assigned probabilities. A call set-up is initiated and if the chosen route is available, the call route is established. Otherwise, a new route is chosen randomly, using the same probabilities, but excluding the old route. This procedure continues until the list is exhausted.

Determination of $\Delta(k,j)$ and $\theta_{km}$ Factors

Initially, it is assumed that in the near future (the next half hour to two hours) traffic on link k will behave as if it comes from an independent offered load which behaves like a Poisson process with intensity $\lambda_k$. Given this assumption, and the additional assumption that the holding times are all exponentially distributed with the same mean length h, then link k behaves like a $M\equiv M\equiv s_k\equiv s_k$ queuing system.

In this simplified system, $$\Delta(k,j) = \frac{B(s_k,h\lambda_k)}{B(j,h\lambda_k)}, \quad (3)$$

where B is the Erlang-B function. The $\Delta(k,j)$ factors arise from the following consideration: at time $t=0$, there are j busy servers and then one additional call is handled so that the number of busy servers increases to $j+1$; $\Delta(k,j)$ is the probability that, during the duration of the call just added, at least one arriving call will find the link fully occupied.

Even for the situation wherein different links are dependent and "offered loads" are not Poisson nor clearly defined, equation (3) is still used as an approximation to cover this situation. The problem of what value to use for $\lambda_k$ in equation 3 remains to be addressed.

To determine the appropriate $\lambda_k$ values, a nonlinear programming problem must be solved. This problem may be set up and solved by one with ordinary skill in the art on the basis of the following information. The original offered load between nodes I and J is assumed to be a Poisson Process with intensity $\lambda$, where $\lambda$ results from a traffic forecasting process. If a call arrives which has to be routed from node I to J or J to I, it is assigned to route R with probability $P_{I,J,R}$. If route R is available, use route R. If route R is not available, block the call, that is, do not allow for alternate routing. Then, the probabilities $P_{I,J,R}$ which maximize the throughput for this routing scheme are obtained. As a result of solving this maximization problem, predicted offered loads $\lambda_k$ are produced. The difference between $\lambda$ and $\lambda_k$ is that $\lambda$ is a predicted offered load between nodes (in this case, nodes I and J), whereas $\lambda_k$ is a predicted offered load to a link (in this case link k). The process of converting $\lambda$ to $\lambda_k$ is independent of the number of links in a given route.

The Allocation Factors $\theta_{km}$

The purpose of these factors is to allow for the fact that a call which finds a link busy on a route is not necessarily a lost call, since it might have access to other routes designated as admissible for such calls. An approximate method to account for this effect is to choose the factors ($\theta_{km}$) as follows:

Suppose that, of the offered load $\lambda_k$ determined for link k in the above non-linear program, a fraction $\phi_{km}$ comes from the offered load of node-pair m and the fraction $(1-\phi_{km})$ from the loads of other node-pairs. Let $h_{km}$ be the product of blockings of all the routes for node-pair m, other than the route traversing link k. Then $\theta_{km}$ is given by the formula $$\theta_{km} = \phi_{km} h_{km} + (1-\theta_{km}).$$

The quantities $\{\phi_{km}\}$ and $\{h_{km}\}$ are available from the solution of the non-linear program.

The results of solving such a non-linear programming problem for the network of FIG. 1 are given in TABLE V for the case of one and two link routes.

TABLE V

| Node I | Node J | $\lambda$ Node-Pair Load | $P_{I,J,R}$ Route 1 | 2 | 3 | $\lambda_k$ Trunk Group Load | Allocation Factors $\theta_{k1}$ | $\theta_{k2}$ | $\theta_{k3}$ | $\theta_{k4}$ | $\theta_{k5}$ | $\theta_{k6}$ |
|---|---|---|---|---|---|---|---|---|---|---|---|---|
| 1 | 2 | 0.9 | 1.00 | 0. | | 1.35 | 0.557 | 0.806 | 1.0 | — | 1.0 | — |
| 1 | 3 | 0.6 | 0.981 | 0.019 | | 0. | — | — | — | — | — | — |
| 1 | 4 | 2.2 | 1.0 | 0. | | 2.21 | 1.0 | 0.998 | 0.373 | — | 1.0 | — |
| 2 | 3 | 1.8 | 1.0 | 0. | | 2.22 | — | 0.888 | — | 0.453 | 1.0 | 1.0 |
| 2 | 4 | 2.3 | 1.0 | 0. | | 2.30 | 1.0 | — | 1.0 | 1.0 | 0.187 | 1.0 |
| 3 | 4 | 1.1 | 1.0 | 0. | | 1.11 | — | 0.996 | — | 1.0 | 1.0 | 0.345 |

The first two columns in TABLE V list the node pairs under study. The third column lists the original load, in erlangs, between the nodes. The probabilities which maximize the throughput for the one and two link routes between the node pairs are shown in the next three columns. These routes are the ones depicted by TABLE II. For instance, routes 1 and 2 for nodes 1 and 2 correspond, respectively, to TG1 and TG3+TG5, that is, link 201 and link 203 plus link 205. The trunk group loads $\lambda_k$ and the factors $\theta_{km}$ resulting from the solution of the non-linear programming problem are shown in TABLE V. If link k cannot be used by node-pair m, the corresponding entry for $\theta_{km}$ is left blank. The loads are the same as shown in the load column of TABLE II, and are used in equation 3 to compute the $\Delta_1(k,j)$ factors in the last column of TABLE II.

The process of going from $\lambda$ to $P_{I,J,R}$ and then to $\lambda_k$ and finally to the $\Delta(k,j)$ $\theta_{km}$ factors represents one proven, workable method. It is to be understood that the separable routing methodologies illustrated by Cases 1 and 2, as well as the associated network arrangements, described herein are not limited to specific forms disclosed by way of example and illustration, but may assume other embodiments and methods limited only by the scope of the appended claims.

What is claimed is:

1. An improved method for routing offered traffic through a network comprising nodes wherein each node is adapted to communicate with each of the other nodes, said method including the steps of generating a set of routes between a pre-selected node pair, and controlling the selection of the traffic route between the pre-selected node pair from the set of routes by evaluating the routes in the set in response to current usage of the set and from future estimates of traffic blockings that take into consideration expected total traffic, including the offered traffic, and wherein in the improved method the step of controlling by evaluating comprises the step of generating occupancy factors, each of said occupancy factors determined from both unassociated occupancy factors and from allocation factors, said unassociated factors being derived from a nominal routing scheme in which offered traffic blocked on a single route is treated as lost and said allocation factors being derived from a nominal routing scheme in which offered traffic is lost only when all routes are busy.

2. An improved method for routing offered traffic through a network comprising nodes wherein each node is adapted to communicate with each of the other nodes, said method including the steps of generating sets of routes between node pairs, and controlling the selection of traffic routes between respective node pairs from the corresponding sets of routes by evaluating the routes in the sets in response to the current usage of the associated routes from estimates of future traffic blockings that take into consideration expected total traffic, including the offered traffic, and wherein in the improved method the step of controlling by evaluating comprises the step of generating occupancy factors, each of said occupancy factors determined from both unassociated occupancy factors and from allocation factors, said unassociated factors being derived from a nominal routing scheme in which offered traffic blocked on a single route is treated as lost and said allocation factors being derived from a nominal routing scheme in which offered traffic is lost only when all routes are busy.

3. The method as recited in claim 2 wherein each set of routes, when evaluated, provides a candidate route having a corresponding occupancy value, and the step of controlling includes the step of routing the traffic over said candidate route only if said corresponding value is less than a predetermined threshold.

4. An improved method for routing a call through a switching system comprising a plurality of intelligent switches wherein each switch is arranged to communicate with each of the other switches, said method including the steps of generating a set of routes between a pair of switches, and controlling the selection of the call route between the pair of switches from route choices determined in response to the current usage of the set and from estimates of future call blockings that take into consideration expected total calls, including the call, and wherein for the improved method the step of controlling the selection comprises the step of determining occupancy factors, each of said occupancy factors derived from both unassociated occupancy factors and from allocation factors, said unassociated factors being generated from a nominal routing scheme in which a call blocked on a single route is treated as a lost call and said allocation factors being generated from a nominal routing scheme in which a call is lost only when all routes are busy.

5. A method for routing offered traffic through a network comprising a plurality of nodes interconnected by links according to a preselected pattern, wherein each node is arranged to communicate with the other nodes, said method comprising the steps of generating for use at preselected intervals, sets of routes, each route composed of at least one link and each set including at least one route between each node pair, generating, at predetermined intervals, occupancy factors as determined by the network configuration, past and present traffic information and estimates of future traffic blocking take into consideration expected total traffic, including the offered traffic, said occupancy factors derived from both unassociated occupancy factors and allocation factors corresponding to a nominal routing scheme over the network, upon a request for service between a particular node pair, computing occupancy values from the said occupancy factors corresponding to the current usage of the links comprising the routes in the set associated with the node pair, and if the minimum of the occupancy values is less than a preselected threshold, routing the request over the route having the minimum value; otherwise, blocking the service request.

6. The method as recited in claim 5 wherein the step of generating occupancy factors includes the step of equating said occupancy factors to the product $\theta_{km}\Delta(k,j)$, where $\Delta(k,j)$ is given by $$\Delta(k,j) = \frac{B(s_k, h\lambda_k)}{B(j, h\lambda_k)},$$

where B is the Erlang-B formula, $s_k$ is the number of potential servers in link k, $0 \leq j \leq s_k k$, h is the expected duration of said offered traffic, $\lambda_k$ is the expected usage of link k of the network and $\theta_{km}$ is the allocation factor associated with the use of link k by a call coupling node-pair m.

7. The method as recited in claim 6 wherein the step of computing occupancy values includes the steps of evaluating for each of the routes in said associated set the quantities $$V(R) = \sum_{k \epsilon R} \Delta_m(k, X_k) = \sum_{k \epsilon R} \theta_{km} \Delta(k, X_k),$$

where R is one route and $\Delta(k, X_k)$ is the unassociated occupancy factor evaluated such that $j = X_k$, $X_k$ being the number of busy servers in link k at the initiation of the service request, and $\theta_{km}$ is the allocation factor associated with the use of link k by calls coupling node-pair m, and the summation is over all links k comprising each route R, and equating said occupancy values for the routes in the set with the V(R) quantities.

8. A method for routing traffic through a network, the network comprising a plurality of switches and a plurality of trunk groups interconnecting preselected switches according to a predetermined pattern, each switch arranged to communicate with each of the other switches, said method comprising the steps of maintaining, within each switch, a table of routes with each of said routes comprising at most two trunk groups between the switch and each of the other switches, maintaining, within each switch, unassociated occupancy factors and allocation factors for all trunk groups terminating on that switch, upon a call received by an originating switch, identifying a destination switch from a call translation, requesting said destination switch to transmit to said originating switch selected ones of said occupancy and allocation factors associated with corresponding ones of said routes between said originating and destination switches, for each of said corresponding ones of said routes, computing occupancy values from said selected ones of said unassociated factors and said allocation factors, and routing said call over the one of said routes associated with the minimum of said values whenever said minimum value is less than a preselected threshold; otherwise, blocking said call.

* * * * *

UNITED STATES PATENT AND TRADEMARK OFFICE
CERTIFICATE OF CORRECTION

PATENT NO. : 4,788,721

DATED : Nov. 29, 1988

INVENTOR(S) : Kamandur R. Krishnan - Teunis J. Ott

It is certified that error appears in the above-identified patent and that said Letters Patent is hereby corrected as shown below:

Column 12, line 6, change "$M \equiv M \equiv s_k \equiv s_k$" to --$M \mid M \mid s_k \mid s_k$--.

Column 12, line 62, change "$(1 - \theta_{km})$" to --$(1 - \phi_{km})$--.

Signed and Sealed this

Thirtieth Day of June, 1992

Attest:

DOUGLAS B. COMER

*Attesting Officer*  *Acting Commissioner of Patents and Trademarks*